No. 819,158. PATENTED MAY 1, 1906.
F. A. NEIDER.
CARRIAGE CURTAIN KNOB.
APPLICATION FILED JUNE 15, 1904.

Witnesses
C. W. Miley.
A. McCormack.

Inventor
Fred A. Neider
By Murray & Murray
Attorneys

UNITED STATES PATENT OFFICE.

FRED A. NEIDER, OF AUGUSTA, KENTUCKY.

CARRIAGE-CURTAIN KNOB.

No. 819,158.  Specification of Letters Patent.  Patented May 1, 1906.

Application filed June 15, 1904. Serial No. 212,605.

*To all whom it may concern:*

Be it known that I, FRED A. NEIDER, a citizen of the United States of America, and a resident of Augusta, county of Bracken, State of Kentucky, have invented certain new and useful Improvements in Carriage-Curtain Knobs, of which the following is a specification.

The object of my invention is to produce a durable as well as an ornate carriage-curtain knob quickly and economically.

Figure 1:
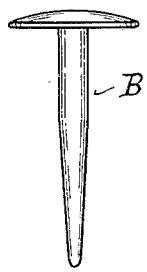
Figure 2:
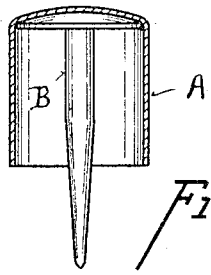
Figure 3:
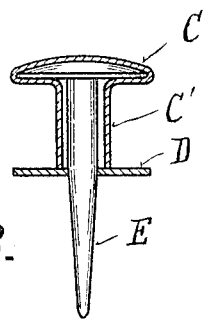
Figure 4:
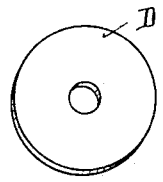

Referring to the accompanying drawings, Figure 1 is an elevation of an ordinary nail used as part of my carriage-curtain knob. Fig. 2 is a view, partly in elevation and partly in section, of the knob embodying my invention in the course of construction. Fig. 3 is a similar view of the same completed. Fig. 4 is an end view of the same.

In forming the carriage-curtain knob embodying my invention I bend or spin a piece of sheet metal A down over the head of an ordinary nail B to form the head C of the knob and carry the sheet metal in around the shank of the nail to form the neck C' of the knob. Then I force a metal disk or washer D over the shank and against the neck C', leaving the end of the nail uncovered to form the shank E of the knob. The uncovered end of the nail makes a strong shank for forcing into the wood of carriages. Any ductile sheet metal may be used, as it is reinforced at all points by the head and shank of the nail. It is seen, therefore, that this knob is at once ornamental and durable and that the steps involved in its production are few and inexpensive.

It is of course obvious that in place of an ordinary nail a rod with a head formed upon it might be used.

What I claim is—

A carriage-curtain knob consisting of a nail, a sheet-metal covering drawn over and under the head of the nail and in adjacent to and parallel with the upper part of the shank of the nail to form the head and neck of the knob leaving the lower end of the nail to form the shank of the knob and a metal washer fitting over the shank and abutting against the lower end of the metal covering to form the collar of the knob.

FRED A. NEIDER.

Witnesses:
   ISAAC REYNOLDS,
   GEO. S. WEIMER.